Sept. 21, 1948.  J. D. AKERMAN ET AL  2,449,683
DIFFERENTIAL PRESSURE VALVE
Filed April 16, 1943

Inventors
John D. Akerman
Mihkel Schonberg
By Williamson & Williamson
Attorneys

Patented Sept. 21, 1948

2,449,683

UNITED STATES PATENT OFFICE 2,449,683

DIFFERENTIAL PRESSURE VALVE

John D. Akerman and Mihkel Schonberg, Minneapolis, Minn.

Application April 16, 1943, Serial No. 483,292

1 Claim. (Cl. 137—53)

This invention relates to differential pressure valves of a type particularly adaptable for use in connection with a pressure applying aviator suit for use at high altitudes and disclosed in Patent Number 2,404,020, granted to J. D. Akerman July 16, 1946, on "Pressure applying aviator's suit with helmet."

It is a general object of the invention to provide a differential pressure valve which can be set to various pressure resistances so that pressures will be relieved at one side of the valve in response to the setting of the valve and wherein the pressure adjustment means is simple and compact yet capable of remaining at the desired adjustment even though subjected to blows and vibration.

Another object of the invention is to provide a compact valve construction with efficient valve seat and head construction to insure proper cut-off without leakage.

A further object of the invention is to provide a differential pressure valve which is conveniently adapted for use in a sheet of fabric such as an air tight aviator's suit.

Still a further object of the invention is to provide a differential pressure valve particularly adapted for aviators' suits wherein means is present for preventing lint and other foreign matter from lodging upon the valve seat.

These and other objects and advantages of the invention will more fully appear from the following description made in connection with the accompanying drawing, wherein like reference characters refer to the same parts throughout the views, and, in which.

The valve disclosed in this application is shown and described in connection with a pressure equalizing aviator's suit to be worn when flying at high altitudes. It is admirably adapted to such use, but it is to be understood that the valve might be very satisfactorily employed in connection with other structures or devices wherein control of differential pressure is desired.

Figure 1:
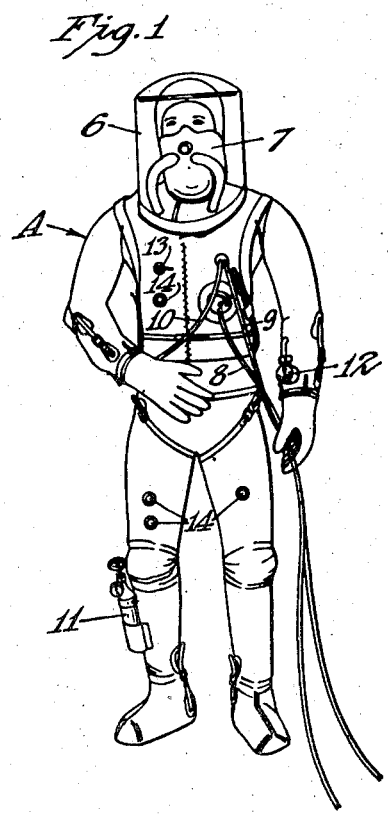
Fig. 1 is a front elevation of a man wearing a complete suit as disclosed in said patent.
Figure 3:
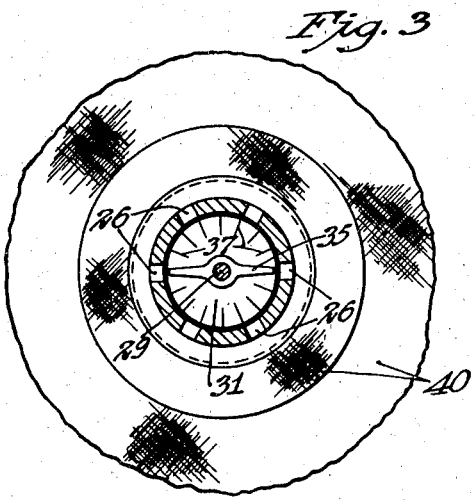
Fig. 3 is a section taken approximately on the line 3—3 of Fig. 2.
Figure 4:
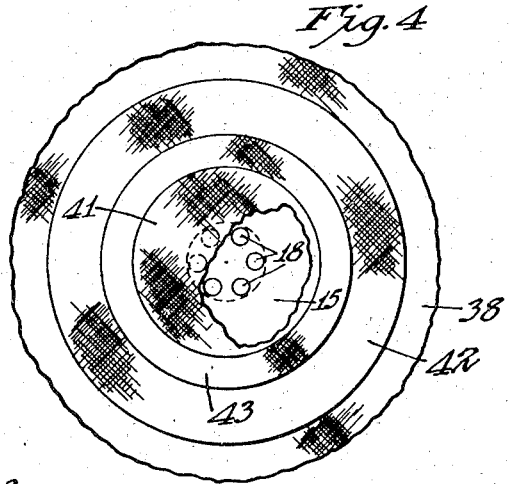
Fig. 4 is a bottom plan of the valve with a portion of the filter fabric broken away.

Fig. 1 shows a pressure controlling aviator's suit indicated generally at A which is equipped with a helmet 6 having an oxygen mask 7 therein. In our co-pending application it is explained in detail how the wearer of the suit is completely encased by the suit and the helmet. An air hose 8 is adapted to be connected to a suitable source of compressed air and the hose 9 is adapted to be connected to an oxygen supply when the aviator is traveling in his plane. However, should he be forced to jump he is supplied oxygen through a hose 10 which connects with an emergency supply tank 11 secured to a leg of the suit A. A pressure gauge 12 is conveniently mounted on a sleeve portion of the suit. A quick acting release valve 13 is incorporated with a suit so air can be quickly and easily exhausted therefrom.

Located in the fabric of the suit at various conveniently spaced points are differential pressure control valves 14. These valves are adapted to permit the escape of air from the interior of the suit periodically as the pressure within reaches a certain desired maximum. Upon the escape of a certain quantity of air the pressure will drop and the valves 14 will cut off the escape of further air until the pressure has again been built up. Thus the suit is permitted to "breathe" and exhaust spent air and also to provide for circulation through the trunk and limbs of the suit.

Figure 2:
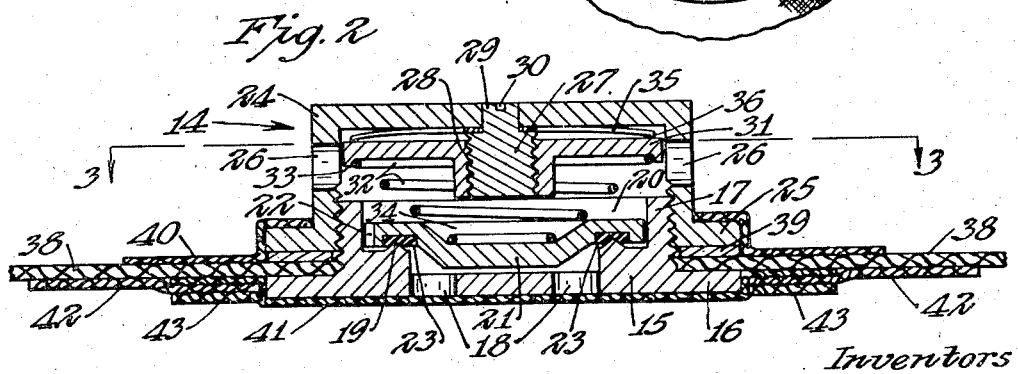
Fig. 2 is an enlarged vertical section through one of the differential pressure valves incorporated with the suit.
Figure 5:
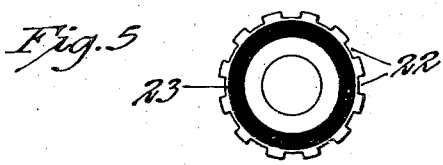
Fig. 5 is a bottom plan view of the valve head.

The valve 14 is illustrated in detail in Figs. 2 through 5. The valve body 15 has a radial flange 16 and an externally threaded concentric flange 17. Adjacent the center of the valve body 15 is a series of air-flow openings 18. On the inside of the valve body 15 is formed a valve seat 19 which, as is clearly shown in Fig. 2, is generally triangular in cross section with an outwardly extending V-shaped relatively sharp seat edge.

Upwardly or outwardly from the valve seat 19 the valve body 15 defines a chamber 20 which is somewhat larger in diameter than the seat 19. Slidably received in the chamber 20 is a valve head 21 of generally circular shape which is provided with a plurality of serrations or cut-outs 22 about its circumference. The valve head 21 relatively closely fits the chamber 20 but is freely slidable therein toward and away from the seat 19 and the serrations 22 permit the free flow of air past the head 21 when said head is moved away from the valve seat 19.

That side of the valve head 21 facing the seat 19 is provided with an annular inset 23 of rubber or other suitable yieldable material so that there is intimate engagement between the head and seat when the head is pressed toward the seat and no leakage will take place.

A valve casing 24 of generally cup shape is provided with a flange 25 about its mouth and the interior of said casing 24 adjacent the flange 25 is threaded so that it will fit upon the concentric flange 17 on the valve body 15. The casing 24 is provided with a plurality of apertures 26 which permit air to flow from the interior of the casing and outwardly thereof. Mounted in the interior top of the valve casing 24 is a plug 27 having a threaded portion 28 and a reduced portion 29 which extends through the top of the valve casing 24 and is provided with a notch or kerf 30. The plug 27 is rotatable relative to the valve casing 24.

Threaded upon the rotary plug 27 is a spring cap 31 against which is adapted to rest one end of a helical spring 32. The spring 32 is interposed between the spring cap 31 and the valve head 21 under compression so that it normally urges said valve head 21 toward the valve seat 19. The spring cap 31 is provided with an annular flange 33 to properly seat one end of the spring 32 and the valve head 21 is provided with a sunken central portion 34 which anchors or seats the other end of said spring 32.

Due to the fact that springs which are apparently the same size and shape and have the same tension but vary some in their tension or compression it is necessary that means be provided for accurately seating or adjusting the valve spring 32 so that the valve head 21 will move away from the seat 19 when a desired pressure is exerted against the valve head. We, therefore, provide a spring member 35 which is suitably secured to the threaded plug 27 and movable therewith. The spring arm 35 extends radially outwardly in opposite directions from plug 27 and is provided with prongs or teeth 36 at its ends. These teeth 36 are adapted to engage small notches 37 formed in the upper face of the spring cap 31. By reason of the engagement of the spring finger 35 with the spring cap 31 said cap will remain in any position to which it is set relative to the threaded plug 27. Obviously, if increased compression on the valve head 21 is desired the threaded plug 27 can be rotated causing the spring cap 31 to move toward the valve head 21 and increase the compression of the spring 32. When a screw driver or other tool is inserted in the kerf 30 of the plug 27 and the plug rotated, the spring cap 31 will remain relatively stationary by reason of the frictional engagement of the spring 32 therewith. However, the leaf spring 35 normally will prevent any relative rotation between the plug 27 and spring cap 31 such as might arise from handling of the suit or vibration to which the valve might be subjected.

In the particular embodiment of the invention shown in the drawings the valve is built into the rubberized fabric of a high altitude aviator's suit. The main fabric of the suit is shown at 38 in Fig. 2. It will be seen that the fabric 38 extends between the flanges 16 and 25 on the valve body 15 and valve casing 24 respectively. When the casing 24 is screwed upon the body 15 to clamp the fabric 38 it is rotated against a rubberized or other suitable fabric ring 39 which shields the edge of the opening in the main rubberized sheet 38 against abrasion due to rotation of the valve casing 24. Over the flange 25 is secured a sealing ring 40 of rubberized fabric which can be secured by an adhesive or by vulcanization.

On the back or bottom of the valve body 15 is a sheet of porous fabric 41 which serves to keep lint and other foreign matter from passing through the openings 18 and to the valve where it might clog the valve and prevent its proper seating. The porous screen 41 is preferably extended beyond the edges of the valve body 15. It overlies a sealing ring 42 which lies around the valve body and is suitably secured to the main rubberized sheet 38. Over the porous fabric 41 and around the edge of the valve body 15 is placed a second sealing ring 43 which may also be formed of a rubberized material.

From the above it will be seen that we have provided a relatively simple, compact and comparatively flat differential pressure valve which, while suitable for numerous purposes, is of particular advantage in connection with a pressure control suit such as an aviator's high altitude flying suit. It is simple and light and while composed of comparatively few parts it is efficient and dependable in operation and can be adjusted accurately to the desired critical pressures for forcing the valve head away from the seat. In the case of an aviator's high altitude suit it is necessary to place the entire body of the aviator under pressure to compensate for reduced pressures in the upper atmosphere. However, it is also necessary that there be some means of exhausting spent air from the interior of the suit, and it is also desirable that there be some circulation of air throughout different parts of the suit for the comfort of the wearer. A valve such as the one disclosed herein is well adapted for such use. The valve head is so positioned in the valve body that there is little possibility that it could ever jam to prevent opening or closing thereof. The sharp edged valve seat in combination with the yielding valve head inset provide positive closing of the valve. Although the compressive forces of the spring 32 can be readily adjusted means is provided to prevent accidental movement of the spring cap relative to the plug 27 so that the adjustment will not be disturbed by vibration of the aircraft.

It will, of course, be understood that various changes may be made in the form, details, arrangement and proportions of the various parts throughout the views without departing from the scope of our invention.

What is claimed is:

A differential pressure valve, comprising a casing, a valve seat in said casing, a valve head movable into and out of engagement with said seat and disposed in said casing, a plug in said casing having a portion exposed outwardly thereof, said plug being rotatable relative to said casing and having a threaded portion extending into said casing, a spring cap threaded on said plug, a spring interposed between said cap and said valve head, a cap retainer in said casing having yieldable frictional engagement with said cap to retain the latter against jarring and rotation about said plug, and said cap retainer comprising a spring finger supported by said casing and said frictional engagement being provided by a yielding contact between said cap and spring finger.

JOHN D. AKERMAN.
MIHKEL SCHONBERG.

REFERENCES CITED

The following references are of record in the file of this patent:

UNITED STATES PATENTS

| Number | Name | Date |
|---|---|---|
| 1,226,148 | Walters | May 15, 1917 |

(Other references on following page)

| Number | Name | Date |
|---|---|---|
| 1,370,254 | Yearsley | Mar. 1, 1921 |
| 1,604,487 | Scovel | Oct. 26, 1926 |
| 1,687,209 | Holmes | Oct. 9, 1928 |
| 1,728,190 | Stolz | Sept. 17, 1929 |
| 1,828,191 | Kuntson | Oct. 20, 1931 |
| 1,931,562 | Thompson | Oct. 24, 1933 |
| 1,972,757 | Blanchard | Sept. 4, 1934 |
| 1,991,601 | DeLasaux | Feb. 19, 1935 |
| 2,096,612 | Freygang | Oct. 19, 1937 |
| 2,168,695 | Asari | Aug. 8, 1939 |
| 2,254,209 | Buttner | Sept. 2, 1941 |
| 2,268,805 | Curtis | Jan. 6, 1942 |
| 2,299,079 | Davis | Oct. 20, 1942 |

FOREIGN PATENTS

| Number | Country | Date |
|---|---|---|
| 261,451 | Great Britain | Nov. 22, 1926 |
| 627,416 | Germany | Mar. 14, 1936 |
| 649,034 | Germany | Aug. 13, 1937 |